US011159234B1

(12) United States Patent
Chriqui et al.

(10) Patent No.: US 11,159,234 B1
(45) Date of Patent: Oct. 26, 2021

(54) N-ARM INTERFEROMETRIC PHOTONIC INTEGRATED CIRCUIT BASED IMAGING AND COMMUNICATION SYSTEM

(71) Applicant: LOCKHEED MARTIN CORPORATION, Bethesda, MD (US)

(72) Inventors: Guy Chriqui, San Mateo, CA (US); Nicolas James Deshler, Berkeley, CA (US); Anthony Cecere Klee, Boulder, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

(21) Appl. No.: 16/748,664

(22) Filed: Jan. 21, 2020

(51) Int. Cl.
| H04B 10/11 | (2013.01) |
| H04B 10/079 | (2013.01) |
| H04B 10/2581 | (2013.01) |
| H04J 14/02 | (2006.01) |
| G02F 1/29 | (2006.01) |
| G02B 6/12 | (2006.01) |
| G01S 17/02 | (2020.01) |

(52) U.S. Cl.
CPC ... H04B 10/07953 (2013.01); H04B 10/2581 (2013.01); H04J 14/0227 (2013.01); G01S 17/02 (2013.01); G02B 6/12009 (2013.01); G02F 1/292 (2013.01); H04B 10/11 (2013.01)

(58) Field of Classification Search
CPC .......... H04B 10/07953; H04B 10/2581; H04B 10/11; H04J 14/0227; G01S 17/02; G02B 6/12009; G02F 1/292
USPC .................................................. 398/118–131
See application file for complete search history.

(56) References Cited

U.S. PATENT DOCUMENTS

| 8,913,859 B1* | 12/2014 | Duncan | G02B 27/50 385/33 |
| 9,754,985 B1* | 9/2017 | Duncan | H01L 27/14627 |
| 2005/0111773 A1* | 5/2005 | Verdiell | H01S 5/4031 385/14 |
| 2006/0210279 A1* | 9/2006 | Hillis | H04B 10/1121 398/118 |
| 2016/0033766 A1* | 2/2016 | Hajimiri | H04B 10/116 348/322 |
| 2016/0245895 A1* | 8/2016 | Lane | G02B 6/12011 |
| 2017/0234984 A1* | 8/2017 | Khial | G01S 7/486 356/5.1 |
| 2017/0324162 A1* | 11/2017 | Khachaturian | H01Q 21/065 |
| 2017/0346565 A1* | 11/2017 | Dawson | H04B 10/1129 |

(Continued)

OTHER PUBLICATIONS

Su et al, Interferometric imaging using Si3N4 photonic integrated circuits for a SPIDER imager, May 2018, Opt. Express 26, 12801-12812. (Year: 2018).*

Primary Examiner — Dibson J Sanchez
(74) Attorney, Agent, or Firm — Morgan, Lewis & Bockius LLP

(57) ABSTRACT

A scalable interferometric imaging and laser communications system integrated as a single satellite payload is provided. Multiple lenslets are coupled via associated waveguides to a single multi-mode interferometer in an N-arm beam combination using a PIC based architecture. The multi-mode interferometer is coupled to a communication sensor via a splitter and to an imaging sensor via an array waveguide grating, which in turn are coupled to a processor. The system interferes all input waveguides simultaneously and provides OPD control over individual input waveguides.

19 Claims, 6 Drawing Sheets

(56) References Cited

U.S. PATENT DOCUMENTS

| | | | |
|---|---|---|---|
| 2017/0357055 A1* | 12/2017 | Spector | G02B 6/293 |
| 2017/0357142 A1* | 12/2017 | Spector | G01S 7/4817 |
| 2018/0120085 A1* | 5/2018 | Lane | G02B 6/12002 |
| 2018/0123699 A1* | 5/2018 | Fatemi | H04B 10/613 |
| 2018/0321569 A1* | 11/2018 | Spector | G02B 21/0032 |
| 2018/0348592 A1* | 12/2018 | Hosseini | G01S 17/02 |
| 2019/0003820 A1* | 1/2019 | van Leeuwen | G01B 9/02051 |
| 2019/0132534 A1* | 5/2019 | Moebius | G02B 6/4215 |

* cited by examiner

US 11,159,234 B1

N-ARM INTERFEROMETRIC PHOTONIC INTEGRATED CIRCUIT BASED IMAGING AND COMMUNICATION SYSTEM

STATEMENT REGARDING FEDERALLY SPONSORED RESEARCH OR DEVELOPMENT

Not applicable

FIELD OF THE INVENTION

The present invention generally relates to free space optical communications (FSOC) and imaging, and more particularly, to a scalable multi-use optical system having both FSOC and imaging features.

BACKGROUND

The industry is trending toward large constellations of small satellites, where size, weight and power (SWaP) is at a premium. Imaging and laser communication are two of the most common functions required, but typical payloads are prohibitively large and not scalable. State of the art research is focused on lowering SWaP and improving scalability of each of these functions using photonic integrated circuits (PICs) but current architectures still face challenges as they scale and increase in complexity. Furthermore, the current architectures lack a one size fits all payload for imaging or laser communication.

No known solid-state optical payload currently exists that can perform both imaging and communication. Typically, space-based payloads are predominantly single function systems, resulting in the emergence of module categories (e.g., imager, communications, processor, flight control, etc.). Low SWaP designs for any one module category are typically achieved through increased computational dependence. The resulting segregated module category systems lead to higher SWaP and higher manufacturing/operational costs.

SUMMARY

In some aspects, a photonic integrated circuit (PIC) imaging and communication system is provided. The PIC imaging and communication system includes a plurality of apertures and a multi-mode N-arm interferometer. The PIC imaging and communication system also includes a plurality of waveguides, each waveguide coupling a separate one of the apertures to the multi-mode N-arm interferometer. The PIC imaging and communication system further includes a processor coupled to the plurality of waveguides. The PIC imaging and communication system also includes a sensor coupled to the processor and to the multi-mode interferometer.

In other aspects, a method of providing a photonic integrated circuit (PIC) imaging and communication system is provided. The method includes providing a lenslet array having a plurality of lenslets. The method also includes coupling the plurality of lenslets to a multi-mode N-arm interferometer via a plurality of waveguides, wherein each lenslet is coupled via a separate waveguide of the plurality of waveguides. The method further includes coupling the plurality of waveguides to a processor and coupling the processor to a sensor. The method also includes coupling the multi-mode interferometer to the sensor and configuring the multi-mode N-arm interferometer to interfere all input waveguides simultaneously.

In yet other aspects, a space-based payload system is provided. The space-based payload system includes a photonic integrated circuit (PIC) imaging and communication module. The PIC imaging and communication module includes a plurality of apertures; a multi-mode N-arm interferometer; a plurality of waveguides, each waveguide coupling a separate one of the apertures to the multi-mode N-arm interferometer; a processor coupled to the plurality of waveguides; and a sensor coupled to the processor and to the multi-mode interferometer. The space-based payload system also includes a processor module and a control module. The PIC imaging and communication module, the processor module and the control module are coupled together via a bus. The PIC imaging and communication module is configured to interfere all input waveguides simultaneously and to provide optical path difference control over individual input waveguides.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
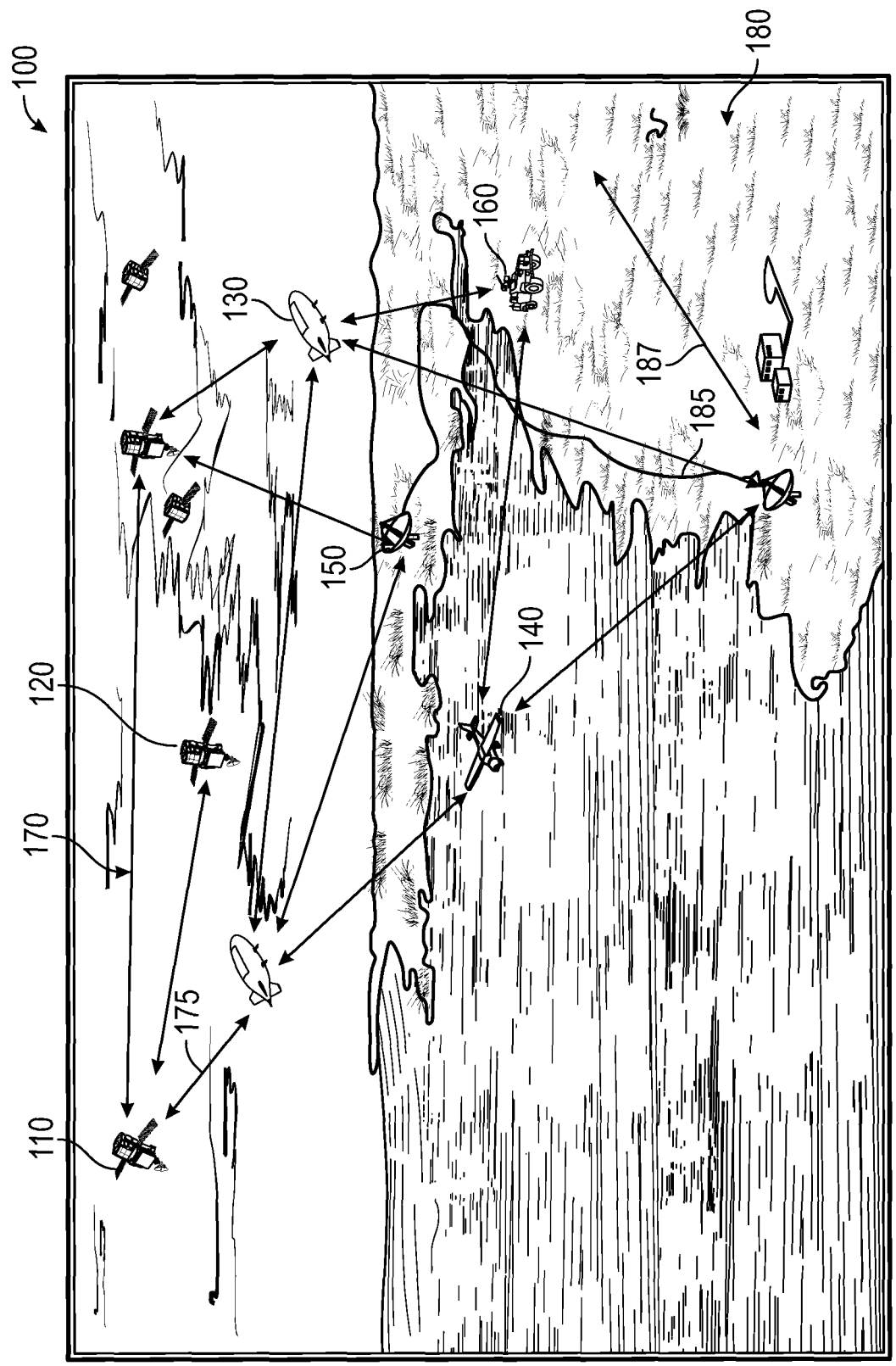
FIG. 1 is a schematic diagram illustrating an example satellite communication system.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to methods and configurations for providing a scalable multi-use optical system having integrated FSOC and imaging features. The disclosed scalable multi-use optical system provides a PIC based computational imaging system combined with a PIC based coherent beam communication system in a single optical payload. The disclosed PIC based architecture interferes all input waveguides simultaneously rather than in a typical pair-wise structure. Optical path difference (OPD) control over individual input waveguides provides for fringe scanning for interferometric imaging and constructive beam combination for boosting or non-mechanical steering of transmitted or received optical communication signals. The disclosed architecture departs from 2-arm interferometry by using N-arm interferometry and an array waveguide grating (AWG), along with a non-redundant lenslet configuration and signal processing algorithms. Thus, the subject technology spans the segregated imaging and communications module categories while exploiting reduced SWaP benefits of PIC based systems to provide combined low cost SWaP (C-SWaP) FSOC terminals and low C-SWaP imaging payloads.

The subject technology has significant advantages over the typical single-function segregated module category architecture. For example, the subject technology provides numerous quantitative performance improvements to both imaging and communication capabilities, as well as lithographic manufacturing and scalability benefits. N-arm interferometry techniques yield [N−1] times the number of spatial frequency samples compared to a 2-arm interferometry architecture for a design with non-redundant lenslet arrays. This amounts to improvements in image quality by a factor of about 2.5. Denser sampling of the spatial frequency domain affords three equally important benefits to imaging. First, it permits greater flexibility when selecting the system's Field-of-View (FOV). Second, it mitigates the need for compressed sensing and computationally intensive reconstruction tasks. Third, it approaches diffraction-limited imaging comparable to lensed optical systems.

The N-arm interferometric PIC design of the subject technology is vastly simplified in comparison to precedent 2-arm interferometric PIC designs. Fewer waveguide paths are needed as all route to a single multi-mode interferometer. Thus, the quantity and complexity of lithographic features are limited. In turn, manufacturing costs for the full payload assembly may be reduced.

Another benefit of the disclosed PIC design is that the number of input and output waveguides are independent of one another, lending to an easily scalable architecture. The number of input waveguides is left as a design choice and should be determined based on the image resolution requirements for a particular system. The number of output waveguides depends solely on the number of spectral channels de-multiplexed at the AWG. This also results in a reduction of the total number of required output detectors and overall power consumption.

FIG. 1 is a schematic diagram of an example satellite communication system 100 having geosynchronous orbit communications satellites (e.g., GEO SatCom) 110, low-earth orbit (LEO) satellites 120, high altitude airships 130, aircraft 140, fixed ground stations 150 and mobile ground stations 160. The satellite communication system 100 includes an FSOC network 170 having multiple FSOC links 175, as well as a ground based network 180 having both fiber links 185 and fixed point wireless links 187.

The FSOC architecture provides many benefits. For example, the FSOC links 175 are fade-resistant communication links and non-mechanical jitter compensation is provided for FSOC links 175 that are space links. The FSOC architecture also provides integration with reduced SWaP slow beam steering for large angle pointing and provide for large antenna gains that result in lower power requirements. The FSOC architecture allows for conformal integration with air and space vehicles (e.g., GEO SatComs 110, LEO satellites 120, high altitude airships 130, aircraft 140). As shown in FIG. 1, with the addition of the FSOC links 175 on the ground (e.g., fixed point wireless links 187), the FSOC architecture is deployable in ground, air and space systems.

Figure 2:
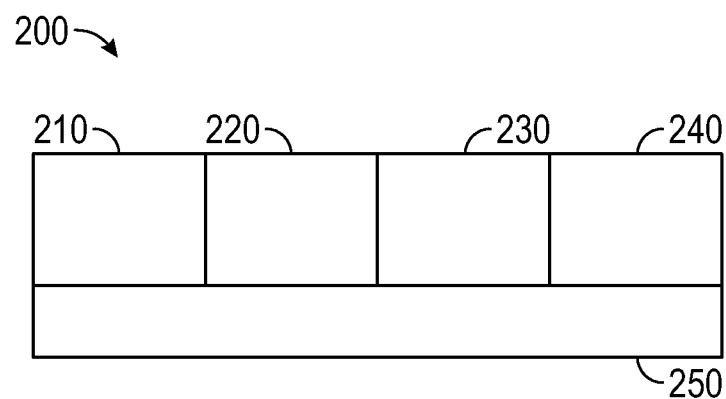
FIG. 2 is a block diagram illustrating an example of a space-based system with segregated single function modules.

FIG. 2 is a block diagram illustrating an example of a space-based payload system 200. The space-based payload system 200 has segregated single-function modules including an imager module 210, a communication module 220, a processor module 230 and a control module 240. The individual modules 210, 220, 230, 240 are tied together by a bus 250.

Figure 3:
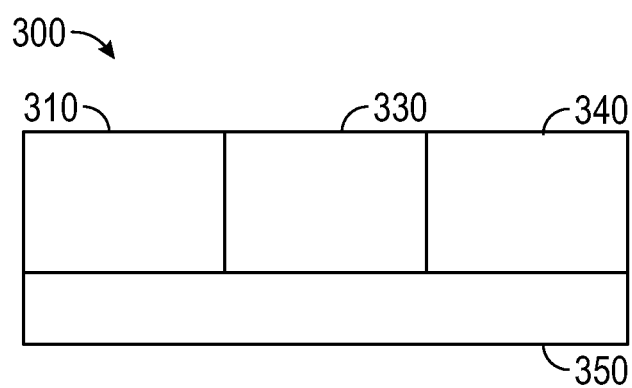
FIG. 3 is a block diagram illustrating an example of a space-based system with a multiple function module, according to certain aspects.

FIG. 3 is a block diagram illustrating an example of a space-based payload system 300, according to certain aspects of the subject technology. The space-based payload system 300 has an integrated imager and communication module 310, a processor module 330 and a control module 340. The individual modules 310, 330, 340 are tied together by a bus 350. As shown in FIGS. 2 and 3, the space-based payload system 300 has a smaller size than the space-based payload system 200, and thus a reduced SWaP as well.

Figure 4:
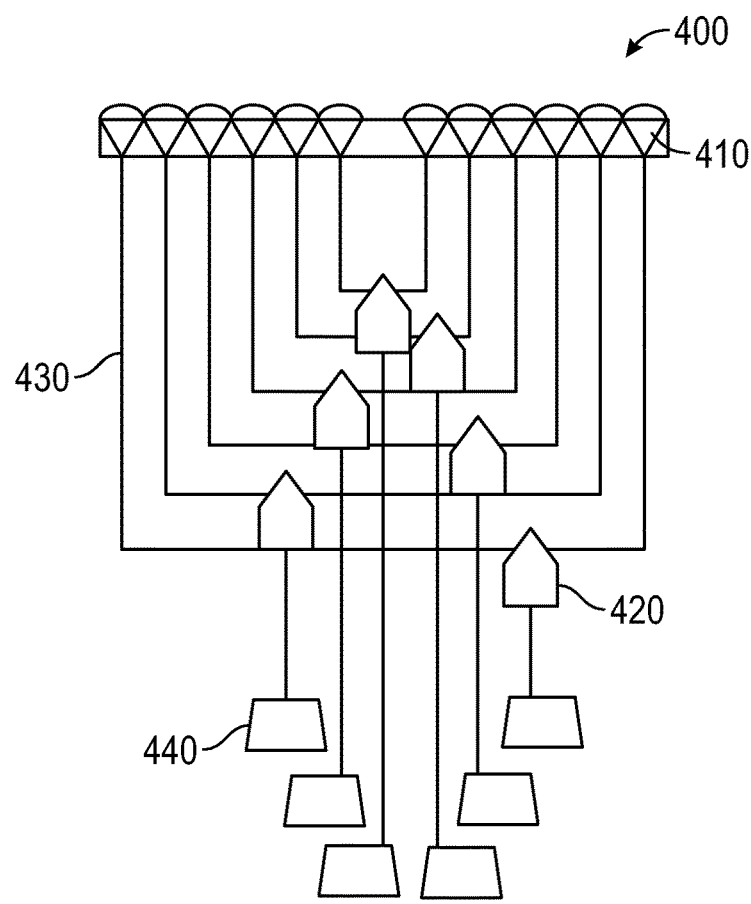
FIG. 4 is a schematic diagram illustrating an example 2-arm beam combination architecture.

With regard to imaging, FIG. 4 is a schematic diagram illustrating an example 2-arm beam combination system 400. The 2-arm beam combination system 400 is a low SWaP PIC based system for interferometric imaging. The 2-arm beam combination system 400 has multiple lenslets 410, multiple interferometers 420, multiple corresponding AWGs 440 and a resulting large number of waveguide paths 430. Thus, scaling the 2-arm beam combination system 400 may require many system outputs. For example, as shown in FIG. 4, the 2-arm beam combination system 400 requires 18 spectral channels (e.g., waveguide paths 430) for each of 6 baseline/aperture pairs that are associated with the 12 lenslets 410, which requires 108 outputs (e.g., 12/2*18=108).

Figure 5:
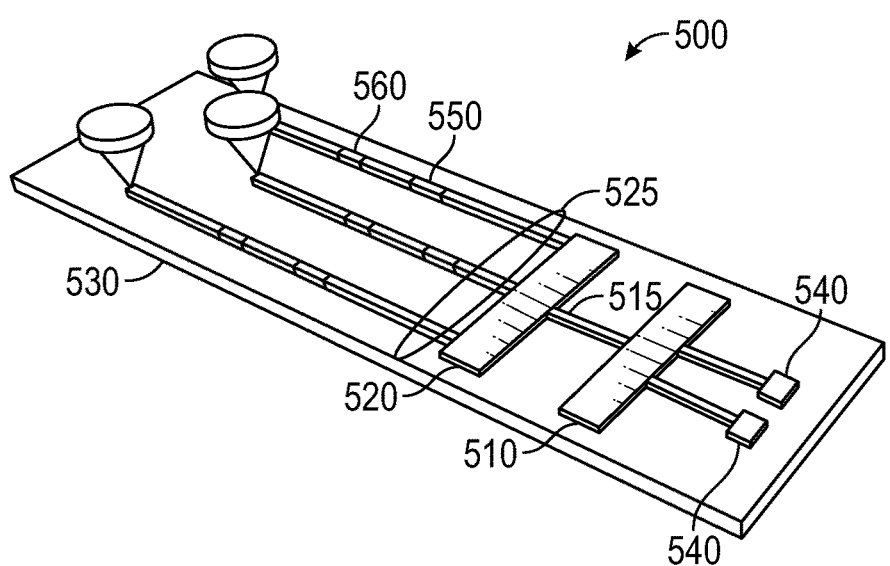
FIG. 5 is a perspective view of an example laser communication head.

With regard to communications, typical FSOC monolithic apertures are not compatible with new satellite platforms due to high SWaP characteristics and require mechanical steering that induces platform jitter, thus impairing performance. FIG. 5 shows an example PIC based laser communication head 500. A beam splitter 510 and a beam combiner 520 are disposed on a substrate 530. One or more detectors 540 (e.g., laser or laser input port) are disposed on the substrate 530 and coupled to the beam splitter 510. The beam splitter 510 is coupled to the beam combiner 520, providing a single data stream 515 between the beam splitter 510 and the beam combiner 520. The beam combiner 520 is coupled to multiple semiconductor amplifiers 550 that are in turn each coupled to a phase shifter 560. For example, as shown in FIG. 5, the semiconductor amplifiers 550 and phase shifters 560 may be arranged in parallel traces 570 from the beam combiner 520. Here, for N trace lines 570, each having a semiconductor amplifier 550 and a phase shifter 560, the beam combiner 520 may provide N cophased copies 525. Thus, laser communication head 500 is a non-mechanically steered laser communication head with reduced SWaP characteristics compatible with new satellite platforms.

Figure 6:
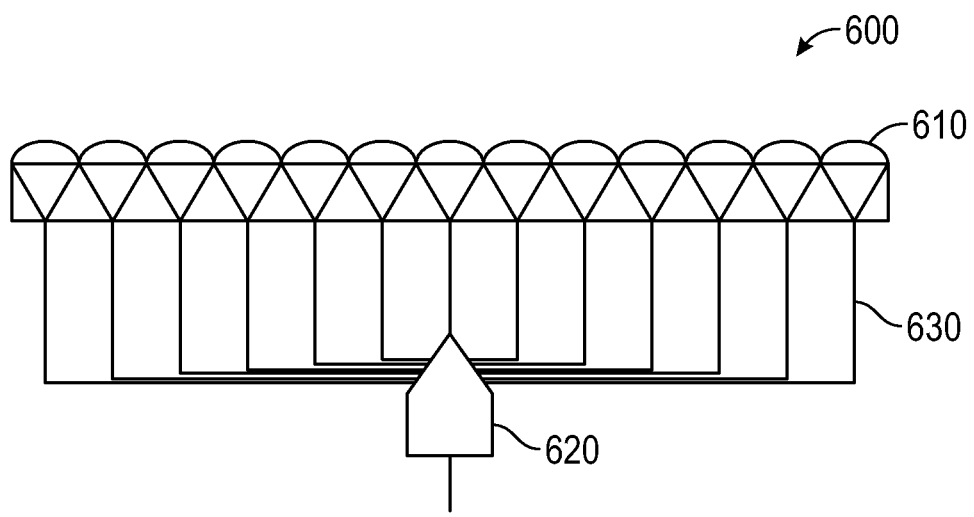
FIG. 6 is a schematic diagram illustrating an example N-arm beam combination architecture, according to certain aspects.

As opposed to the 2-arm interferometry shown in FIG. 4, N-arm interferometry is currently provided in telescopes by mixing fiber bundles. The current N-arm telescope system for a useful aperture requires system and fiber bundle components that are the size of a football field, making this solution impractical for low SWaP commercial uses. In one or more aspects, the subject technology includes N-arm interferometry on a low SWaP PIC based system using an N-arm beam combination 600 as shown in FIG. 6. The N-arm beam combination 600 includes multiple lenslets 610 connected via waveguide paths 630 to a single multi-mode interferometer 620. Thus, fewer waveguide paths 630 are needed (e.g., one waveguide path 630 per lenslet 610) as all waveguide paths 630 route to the single multi-mode interferometer 620, which limits the quantity and complexity of lithographic features and in turn reduces the manufacturing costs for a full payload assembly.

Figure 7:
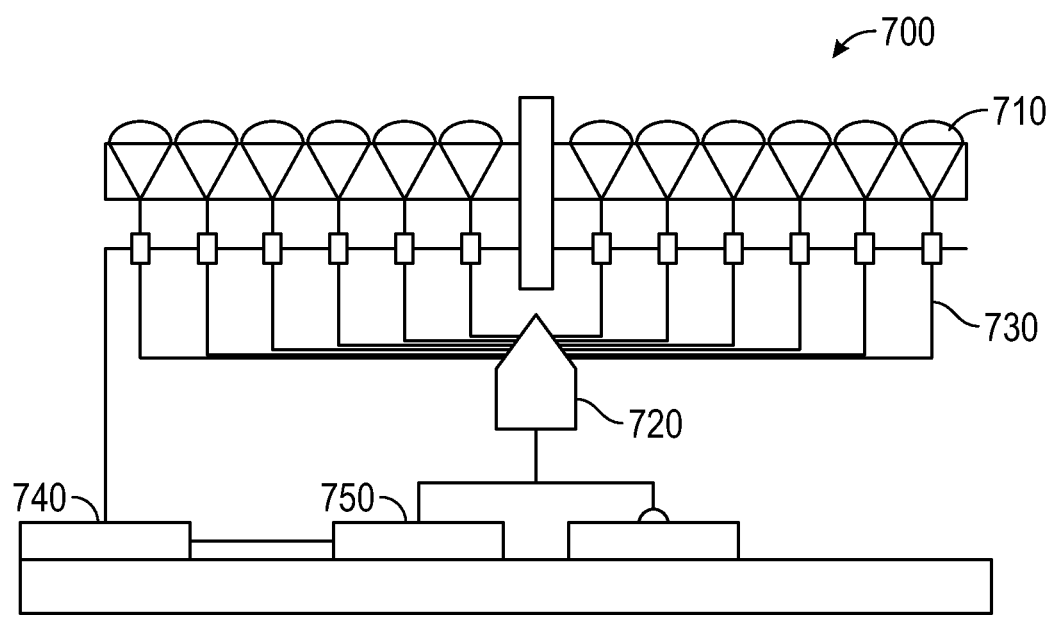
FIG. 7 is a schematic diagram illustrating an example integrated interferometric imaging and laser communication system, according to certain aspects.

An integrated interferometric imaging and laser communication system 700 is shown in FIG. 7. The interferometric imaging and laser communication system 700 is a 2-in-1 PIC based device providing a computational imaging system and a coherent beam communication system. Here, the PIC based architecture interferes all input waveguides simultaneously rather than in a pair-wise fashion. Multiple optical ports (e.g., lenslets 710) are coupled via waveguides 730 to a single multi-mode interferometer 720. A processor 740 is coupled to the waveguides 730 and to a sensor 750. The multi-mode interferometer 720 is also coupled to the sensor 750. The interferometric imaging and laser communication system 700 provides OPD control over each individual waveguide 730, which provides fringe scanning on the interferometric imaging side and constructive beam combination for boosting received communication signals on the laser communication side.

Figure 8:
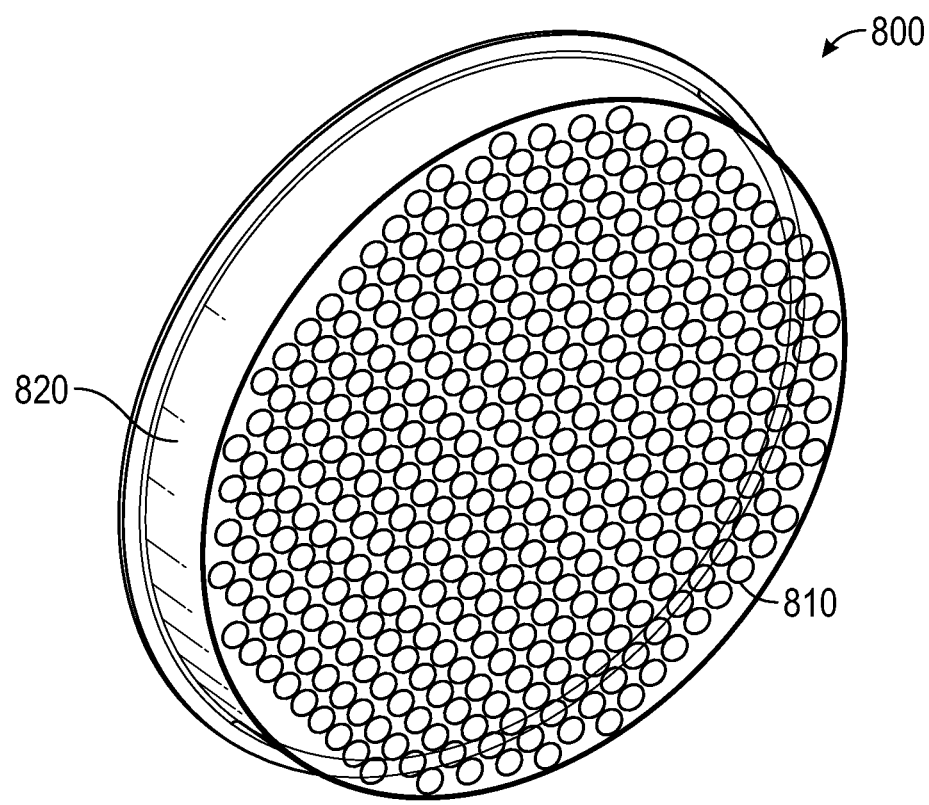
FIG. 8 is a perspective view of an example lenslet array, according to certain aspects.

An example lenslet array 800 is shown in FIG. 8. The lenslet array 800 includes a large number of lenslets 810 arranged within a housing 820 in a desired grid array pattern. The lenslet array 800 may be the front end of the interferometric imaging and laser communication system 700. Thus, having one or more multi-mode interferometers 720 interfacing with all of the lenslets 810 via a single waveguide path 730 per lenslet 810 provides reduced SWaP and scalability of the resulting payload. For example, the SWaP may be reduced orders of magnitude (e.g., at least 100×) over typical monolithic FSOC terminals and imaging systems.

Figure 9:
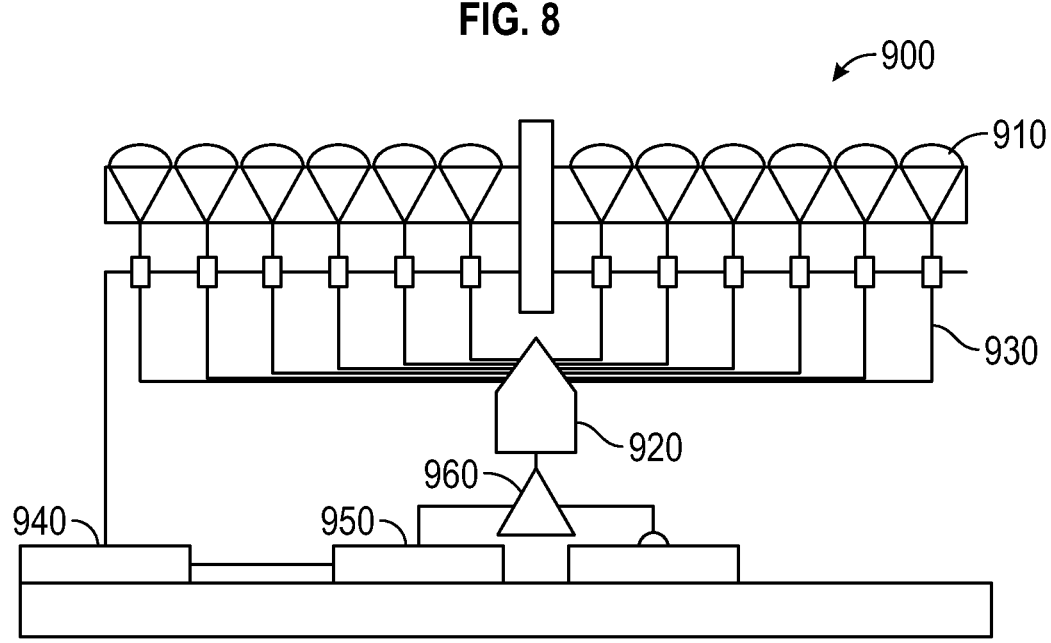
FIG. 9 is a schematic diagram illustrating an example N-arm communication system, according to certain aspects.

FIG. 9 shows an example PIC based N-arm communication system 900, according to certain aspects. Multiple lenslets 910 are coupled via waveguides 930 to a single multi-mode interferometer 920. A processor 940 is coupled to the waveguides 930 and to a sensor 950. The multi-mode interferometer 920 is coupled to a splitter 960, which is coupled to the sensor 950.

Figure 10:
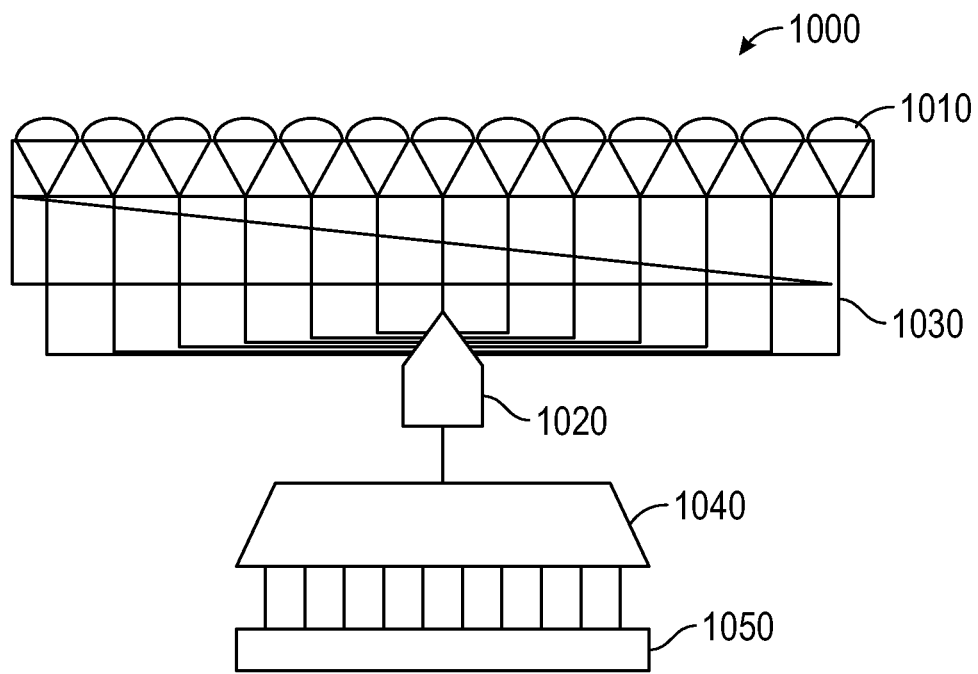
FIG. 10 is a schematic diagram illustrating an example N-arm imaging system, according to certain aspects.

FIG. 10 shows an example PIC based N-arm imaging system 1000, according to certain aspects. Multiple lenslets 1010 are coupled via waveguides 1030 to a single multi-mode interferometer 1020. An array waveguide grating 1040 is coupled to the single multi-mode interferometer 1020 and to a sensor 1050.

The commonality of both the N-arm communication system 900 and the N-arm imaging system 1000 having multiple lenslets 910, 1010 coupled via one-to-one waveguides 930, 1030 to a single multi-mode interferometer 920, 1020 provides for integration of interferometric imaging and laser communications in one combined payload. Thus, the common hardware of the two systems 900, 1000 provides active OPD control on every input waveguide 930, 1030, a single multi-mode interferometer 920, 1020 for light mixing, and a lenslet array (e.g., lenslet array 800) for light collection and FOV improvement. In addition, the communication signal processing and the image signal processing may utilize similar matrix math.

An integrated interferometric imaging and laser communication system (e.g., combined N-arm communication system 900 and N-arm imaging system 1000) may have essential PIC design considerations. For example, the number of waveguide inputs for the system, as well as a coordinated waveguide expansion, may factor in to the end design of the integrated interferometric imaging and laser communication system. Lenslet configuration constraints are also taken into consideration. For example, the collection $\{\xi_{1j}\}$ may be required to have no duplicates (e.g., non-redundant array). As another example, all elements in $\{\xi_{1j}\}$ may be required to be significantly different (e.g., greater than one standard deviation of the frequency uncertainty). As yet another example, the Least-Common-Multiple (LCM) of the frequencies collection $\{\lambda/\xi_{1j}\}$ may be required to be minimized to enforce short fringe periods and remain within realistic limits of waveguide expansion.

Figure 11:
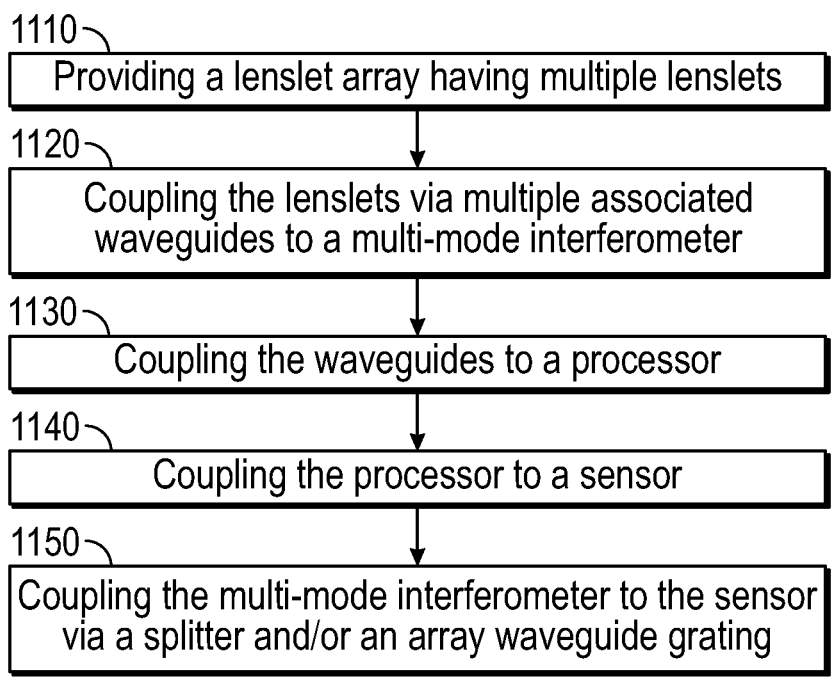
FIG. 11 is a flow diagram illustrating an example of a method for providing a scalable multi-use optical system with integrated FSOC and imaging, according to certain aspects.

FIG. 11 is a flow diagram illustrating an example of a method 1100 for providing an integrated interferometric imaging and laser communication system (e.g., 700 of FIG. 7), according to certain aspects of the subject technology. The method 1100 includes providing a lenslet array (e.g., 800 of FIG. 8) having multiple lenslets (e.g., 810 of FIG. 8) (1110). The method also includes coupling the lenslets via multiple associated waveguides (e.g., 730 of FIG. 7) to a multi-mode interferometer (e.g., 720 of FIG. 7) (1120). The method further includes coupling the waveguides (e.g., 730 of FIG. 7) to a processor (e.g., 740 of FIG. 7) (1130). The method also includes coupling the processor (e.g., 740 of FIG. 7) to a sensor (e.g., 750 of FIG. 7) (1140). The method further includes coupling the multi-mode interferometer (e.g., 720 of FIG. 7) to the sensor (e.g., 750 of FIG. 7) via a splitter (e.g., 960 of FIG. 9) and/or an array waveguide grating (e.g., 1040 of FIG. 10) (1150). The resulting scaled interferometric imaging and laser communication system is configured to be a single satellite payload for providing both computational imaging and coherent beam communication.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A photonic integrated circuit (PIC) imaging and communication system, the system comprising:
   a plurality of apertures,
   wherein the plurality of apertures comprises a first plurality of apertures for receiving communication signals and a second plurality of apertures different from the first plurality of apertures for receiving image signals;
   a multi-mode N-arm interferometer;
   a plurality of waveguides, each waveguide coupling a separate one of the apertures to the multi-mode N-arm interferometer;
   a sensor coupled to the N-arm multi-mode interferometer; and
   a processor coupled to the plurality of waveguides and the sensor and configured to perform both processing of the communication signals and processing of the image signals using a common matrix algorithm,
   wherein the multi-mode N-arm interferometer, the plurality of waveguides, the processor and the sensor of the system are integrated on a single PIC.

2. The PIC imaging and communication system of claim 1, wherein the multi-mode N-arm interferometer is configured to interfere all input waveguides simultaneously.

3. The PIC imaging and communication system of claim 1, wherein the multi-mode N-arm interferometer is an N×1 interferometer.

4. The PIC imaging and communication system of claim 1, wherein the multi-mode N-arm interferometer is an N×2 interferometer.

5. The PIC imaging and communication system of claim 4, wherein one portion of the N×2 interferometer is coupled to half of the plurality of apertures and another portion of the N×2 interferometer is coupled to the other half of the plurality of apertures.

6. The PIC imaging and communication system of claim 5, wherein each waveguide output has all colors.

7. The PIC imaging and communication system of claim 1, further comprising a lenslet array comprising a plurality of lenslets disposed in a housing, wherein each of the plurality of lenslets is associated with one of the plurality of apertures.

8. The PIC imaging and communication system of claim 7, wherein the lenslet array is a non-redundant lenslet array.

9. The PIC imaging and communication system of claim 1, wherein the processor is configured to provide optical path difference control over individual input waveguides.

10. The PIC imaging and communication system of claim 1, further comprising an array waveguide grating coupled to the multi-mode N-arm interferometer and to the sensor.

11. The PIC imaging and communication system of claim 1, wherein a number of input waveguides and a number of output waveguides are independent of one another.

12. The PIC imaging and communication system of claim 11, wherein the number of input waveguides is based on image resolution requirements of the PIC imaging and communication system.

13. The PIC imaging and communication system of claim 11, further comprising an array waveguide grating, wherein the number of output waveguides is based on a number of spectral channels de-multiplexed at the array waveguide grating.

14. A method of providing a photonic integrated circuit (PIC) imaging and communication system, the method comprising:
   providing a lenslet array having a plurality of lenslets, wherein the plurality of lenslets comprises a first plurality of lenslets for receiving communication signals and a second plurality of lenslets different from the first plurality of lenslets for receiving image signals;
   coupling the plurality of lenslets to a multi-mode N-arm interferometer via a plurality of waveguides, wherein each lenslet is coupled via a separate waveguide of the plurality of waveguides;
   coupling the plurality of waveguides to a processor;
   coupling the processor to a sensor to receive image signals generated by the sensor;
   configuring the processor to perform both processing of the communication signals and processing of the image signals by using a common matrix algorithm;
   coupling the multi-mode interferometer to the sensor;
   configuring the multi-mode N-arm interferometer to interfere all input waveguides simultaneously;
   integrating the multi-mode N-arm interferometer, the plurality of waveguides, the processor and the sensor on a single PIC.

15. The method of claim 14, further comprising:
   coupling an array waveguide grating to the multi-mode N-arm interferometer and to the sensor.

16. The method of claim 15, further comprising:
   configuring a number of output waveguides based on a number of spectral channels to be de-multiplexed at the array waveguide grating.

17. The method of claim 14, further comprising:
   configuring a number of input waveguides based on defined image resolution requirements.

18. The method of claim 14, further comprising:
   configuring the lenslet array wherein:
   a collection $\{\xi_{1,j}\}$ has no duplicates;
   each element in $\{\xi_{1,j}\}$ is greater than one standard deviation of a frequency uncertainty from any other element in $\{\xi_{1,j}\}$;
   a Least-Common-Multiple (LCM) of a frequencies collection $\{\lambda/\xi_{1,j}\}$ is minimized; and
   indices i and j refer to elements in the lenslet array.

19. A space-based payload system comprising:
a photonic integrated circuit (PIC) imaging and communication module comprising:
- a plurality of apertures,
  wherein the plurality of apertures comprises a first plurality of apertures for receiving communication signals and a second plurality of apertures different from the first plurality of apertures for receiving image signals;
- a multi-mode N-arm interferometer;
- a plurality of waveguides, each waveguide coupling a separate one of the apertures to the multi-mode N-arm interferometer;
- a sensor coupled to the multi-mode N-arm interferometer;
- a processor coupled to the sensor and the plurality of waveguides and configured to perform both processing of communication signals and processing of the image signals using a common matrix algorithm; and
- a control module, wherein the PIC imaging and communication module, the processor module and the control module are coupled together via a bus, and wherein the PIC imaging and communication module is configured to interfere all input waveguides simultaneously and to provide optical path difference control over individual input waveguides, wherein the multi-mode N-arm interferometer, the plurality of waveguides, the processor and the sensor of the space-based payload system are integrated on a single PIC.

* * * * *